(12) United States Patent
Schitthelm

(10) Patent No.: US 10,336,545 B2
(45) Date of Patent: Jul. 2, 2019

(54) TRANSPORT CHUTE HAVING DRIVE MEANS

(71) Applicant: SIEMENS AKTIENGESELLSCHAFT, Munich (DE)

(72) Inventor: Oliver Schitthelm, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/743,503

(22) PCT Filed: Jun. 8, 2016

(86) PCT No.: PCT/EP2016/063052
§ 371 (c)(1),
(2) Date: Jan. 10, 2018

(87) PCT Pub. No.: WO2017/008957
PCT Pub. Date: Jan. 19, 2017

(65) Prior Publication Data
US 2019/0002203 A1    Jan. 3, 2019

(30) Foreign Application Priority Data

Jul. 14, 2015   (DE) .......................... 10 2015 213 195

(51) Int. Cl.
*B65G 37/00*     (2006.01)
*B65G 11/08*     (2006.01)

(52) U.S. Cl.
CPC ............ *B65G 11/081* (2013.01); *B65G 37/00* (2013.01)

(58) Field of Classification Search
CPC .................................................... B65G 11/081
(Continued)

(56) References Cited

U.S. PATENT DOCUMENTS 3,554,351 A * 1/1971 Rothenbach ............ B65B 35/56
198/432
3,928,114 A * 12/1975 Aylon ...................... E04G 21/20
156/351

(Continued)

FOREIGN PATENT DOCUMENTS

EP        0882661 A1   12/1998
EP        1127812 A1    8/2001
(Continued)

*Primary Examiner* — Douglas A Hess
(74) *Attorney, Agent, or Firm* — Laurence Greenberg; Werner Stemer; Ralph Locher

(57) ABSTRACT

A transport chute is suitable for use as a store for articles that are able to be laid one on top of another, in particular packages and items of luggage. The chute contains a chute portion which has an inclined chute surface with a dropping direction along the chute surface. The chute portion is interrupted by an interruption such that the chute surface is subdivided into at least an upper chute surface and lower chute surface. The interruption is configured to make it easier to form at least two layers of articles lying one on top of another below the interruption. The lower chute surface has a driver, which is drivable and actuable counter to the dropping direction, for transporting the articles, the articles of the bottommost layer being able to rest at least in part on the driver in order to be transported.

19 Claims, 3 Drawing Sheets

(58) Field of Classification Search
USPC .................................. 198/560, 561, 562
See application file for complete search history.

(56) References Cited

U.S. PATENT DOCUMENTS

| | | | | |
|---|---|---|---|---|
| 4,099,607 A * | 7/1978 | Brennan | ............... | H01J 9/48 |
| | | | | 193/2 C |
| 5,551,912 A * | 9/1996 | Takemoto | ............ | B65G 47/66 |
| | | | | 193/DIG. 1 |
| 5,655,667 A * | 8/1997 | Isaacs | ................. | B07C 1/04 |
| | | | | 198/460.1 |
| 6,186,724 B1 * | 2/2001 | Hollander | ............. | B65G 1/08 |
| | | | | 193/35 A |
| 6,244,424 B1 | 6/2001 | Reusser et al. | | |
| 6,259,967 B1 * | 7/2001 | Hartlepp | ............. | B65G 11/081 |
| | | | | 198/444 |
| 6,609,607 B2 * | 8/2003 | Woltjer | ............... | B65G 37/02 |
| | | | | 198/457.03 |
| 8,292,061 B2 * | 10/2012 | Iwasa | .................. | B65B 5/061 |
| | | | | 198/407 |
| 8,546,704 B1 * | 10/2013 | Minardi | .............. | G01G 19/42 |
| | | | | 177/25.18 |
| 8,607,964 B2 * | 12/2013 | Kheifets | ............... | B65G 43/08 |
| | | | | 193/21 |
| 8,893,876 B2 * | 11/2014 | Morisod | ........... | B65H 29/6618 |
| | | | | 198/431 |
| 9,969,573 B2 * | 5/2018 | Girtman | ............... | B65G 67/24 |
| 2018/0079606 A1 * | 3/2018 | Dwivedi et al. | | |

FOREIGN PATENT DOCUMENTS

| | | |
|---|---|---|
| GB | 191220385 A | 10/1912 |
| WO | 0006475 A1 | 2/2000 |
| WO | 2013091652 A1 | 6/2013 |

* cited by examiner

TRANSPORT CHUTE HAVING DRIVE MEANS

BACKGROUND OF THE INVENTION

Field of the Invention

The invention relates to the technical field of transport chutes for goods, in particular for packages and baggage items.

In the case of automated sorting processes such as, for example, in package sorting systems or baggage handling and sorting systems at airports, the goods often travel several hundred meters and reach considerable speeds of several meters per second. Discharge from the sorting process often takes place by way of transport chutes. Transport chutes are therefore frequently terminals of a sorting process and simultaneously serve as storage facilities such that removal need not take place at once at the moment of discharge. The transport chute overcomes a height difference between the sorter (sorting plant) and the chute terminal at which the goods are removed such that the weight force of the goods can be used for the transport thereof.

In particular, transport chutes are used as sorter terminals in package sorting systems. The increase in online orders of goods has resulted in a steady rise in the volume of parcels and packages, whereby advantageous embodiments of transport chutes have great potential, above all in parcel sorting centers. To avoid damage to goods, these are slowed down on many transport chutes. To this end, a drive means, frequently in the form of a roller conveyor, is often integrated into the sliding surface which slows down and thus transports the goods in a controlled manner in the direction of the chute terminal by means of a slow drive in the direction of fall. This reduces damage to the goods. The drive means can transport the goods actively or by way of a gravity feed, in the case of a roller conveyor, for example, by way of brake rollers which keep the transport speed constant. If it is necessary to use the transport chute as a storage facility, interruptions, for example, in the form of steps, are often incorporated into the sliding surface to increase the storage capacity in order for several layers of goods to be able to form parallel to the sliding surface, preferably beneath the interruption. By means of the transport—actively and/or passively—of the goods on the sliding surface in the direction of the chute terminal, a bottom layer is formed which rests directly on the smooth sliding surface, tightly packed without too many spaces.

However, as the bottom layer is not as smooth and even as the sliding surface itself to some extent, further goods passing through the transport chute after the formation of the bottom layer become disadvantageously wedged together with the goods of the bottom layer relatively easily. Once initial wedging has developed, further passing in the direction of the chute terminal is also made more difficult. Furthermore, more severe wedging of goods encourages damage to the same. As the goods are unable to pass through the transport chute in the direction of the chute terminal unimpeded due to wedging, an accumulation forms beneath the interruption which prevents complete utilization of the entire volume of the transport chute for storage. Both the weight force of the goods and actuation of the drive means in the direction of the chute terminal exerts a dynamic pressure on the goods in the chute terminal. This dynamic pressure is problematic as damage to goods can occur as a result of compression of the goods due to excessive pressure. Furthermore, discharge, in particular of the bottom layer directly at the chute terminal, is also difficult as a result.

SUMMARY OF THE INVENTION

The object of the present invention is therefore to enable the advantageous filling of the transport chute.

The solution according to the invention provides for a transport chute which is suitable as a storage facility for goods which can be laid on top of each other, in particular packages and baggage items. The transport chute comprises a slide section. The slide section has an inclined sliding surface with a direction of fall along the sliding surface. The said slide section is interrupted by means of at least one interruption, for example, a step. As a result, the sliding surface is divided into at least one upper sliding surface and one lower sliding surface. The aforementioned interruption of the slide section is designed to facilitate the formation of at least two layers, disposed one above the other, of goods beneath the interruption. At least the lower sliding surface further comprises at least one drivable and controllable drive means contrary to the direction of fall for the transportation of goods. The goods of the bottom layer can rest at least partially on the drive means for their transportation.

With regard to a method, the aforementioned object according to the invention is achieved by a method for storage and/or simplified discharge of goods which can be laid on top of each other on a transport chute. The transport chute comprises a slide section. The slide section has an inclined sliding surface with a sliding surface along the direction of fall. In addition, the transport chute comprises a chute terminal beneath the slide section. The aforementioned slide section is interrupted by means of at least one interruption. As a result, the sliding surface is divided into at least one upper sliding surface and one lower sliding surface. At least the lower sliding surface further comprises at least one drivable and controllable drive means contrary to the direction of fall for transporting the goods. The goods of the bottom layer can rest at least partially on the drive means for their transport. The first method step is to let the goods pass along the sliding surface in the direction of fall. The next method step is the transportation of the goods by the drive means operated contrary to the direction of fall.

Advantageous embodiments of the invention are specified in further claims.

BRIEF DESCRIPTION OF THE SEVERAL VIEWS OF THE DRAWING

Preferred embodiments of the invention are explained in more detail hereinafter with reference to the figures, for example. The figures show.

DESCRIPTION OF THE INVENTION

Figure 1:
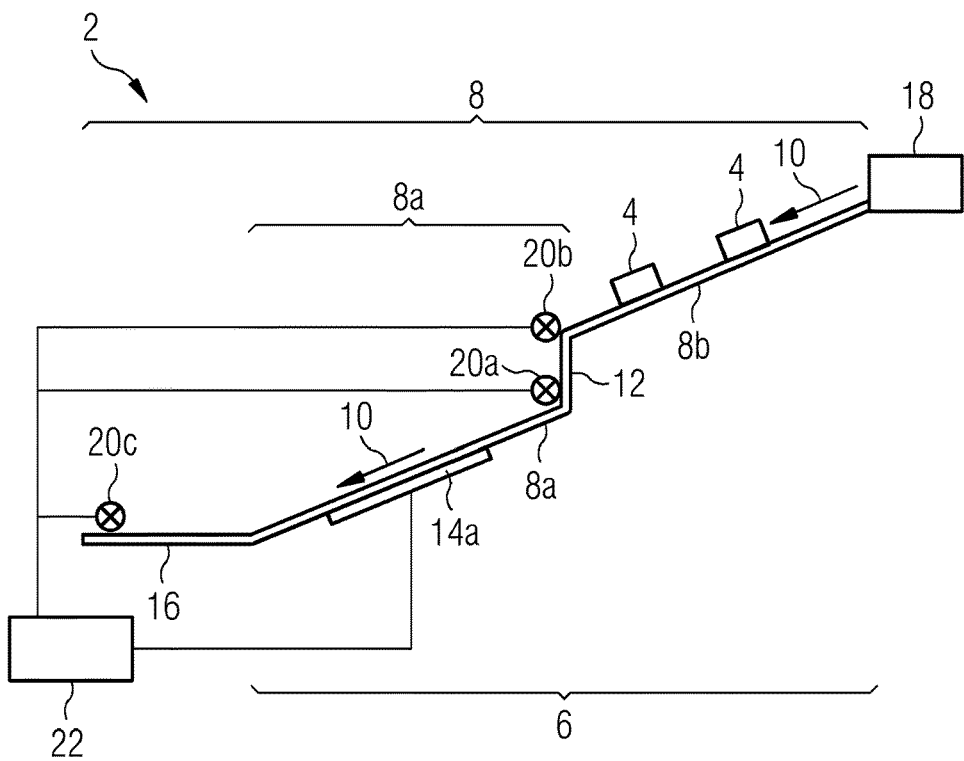
FIG. 1 A lateral diagrammatic view of an embodiment of a transport chute.

FIG. 1 diagrammatically shows a lateral view of a transport chute 2 according to a preferred embodiment of the invention and suitable for use as storage facilities for goods 4 which can be placed on top of each other, in particular for packages and baggage items. The transport chute 2 comprises a slide section 6. The slide section 6 has an inclined sliding surface 8 with a direction of fall 10 along the sliding surface 8. The direction of fall 10 of a transport chute 2 with an inclined sliding surface 8 is determined by the force of gravity and follows the direction of the greatest gradient. In the case of an even sliding surface 8 with an angle of inclination of 0 degrees, it corresponds to the direction of fall 10 of an overall transport direction of the goods 4. The aforementioned slide section 6 is interrupted by means of at least one interruption 12, for example, a step. As a result, the sliding surface 8 is divided into at least one upper sliding surface 8b and one lower sliding surface 8a. The interruption 12 is designed to facilitate the formation of at least two layers of goods 4 placed on top of each other beneath the interruption 12. The lower sliding surface 8a further comprises at least one controllable drive means 14a for transporting the goods 4. The goods 4 of the bottom layer can rest at least partially on the drive means 14a for their transportation. The drive means 14a therefore either extends over only part of the lower sliding surface 8a or over the entire lower sliding surface 8a. Driving of the drive means 14a contrary to the direction of fall 10 during filling already enables a tighter configuration of the bottom layer in the upper region of the lower sliding surface 8a before the bottom layer is formed over the entire sliding surface 8 beneath the interruption 12 and not only in the lower region of the lower sliding surface 8a. The formation of further layers of goods 4 resting on the bottom layer can therefore already take place in the upper area of the lower sliding surface 8a at this time. This enables the advantageous filling of the transport chute 2 overall and thus an increase in its storage capacity.

The transport chute 2 also comprises a chute terminal 16 beneath the slide section 6 at which the goods 4 can be removed. The sliding surface 8 can lead into the chute terminal 16, or comprise this. To prevent the goods 4 from falling unintentionally, the chute terminal 16 can comprise a chute terminal blocker. Filling with goods 4 takes place from a sorter 8 which is arranged above the transport chute 2. The goods 4 shown on the upper sliding surface 8b therefore pass over the entire sliding surface 8 to the chute terminal 16 starting from the sorter 18.

In the case of a filled transport chute 2, the weight force of the goods 4 which are above the chute terminal 16 above all exerts dynamic pressure on the goods 4 in the chute terminal 16 in the direction of fall 10. This dynamic pressure can compress and thus damage the goods 4 and furthermore impedes the discharge of the transport chute 2. Driving the drive means 14a contrary to the direction of fall 10 after completion of filling reduces the dynamic pressure and therefore facilitates removal.

In order that the at least one drive means 14a can be designed differently depending on the application and/or dimensions, the drive means 14a comprises a roller conveyor and/or a conveyor belt. The drive means 14a can be operated contrary to or in the direction of fall 10 or be stopped.

In order to enable the contact-free detection of the goods 4 on the transport chute 2, the transport chute 2 comprises at least one detector 20 for the contact-free detection of the goods 4. Results of the detection can be used for the advantageous actuation of the drive means 14a. The at least one detector 20 comprises a terminal detector 20c and/or a counter-pressure detector 20a and/or a layer formation detector 20b. The terminal detector 20c is designed to detect goods 4 in the chute terminal 16. Provided that the drive means 14a does not let goods 4 pass in the direction of the chute terminal 16 with constant actuation contrary to the direction of fall 10, the presence of goods 4 on the terminal detector 20c is synonymous with the complete formation of the bottom layer. Thus, the complete formation of the bottom layer can be detected with the terminal detector 20c which is advantageously positioned immediately above the sliding surface 8. The counter-pressure detector 20a is designed to detect goods 4 resting on the lower sliding surface 8a immediately beneath the interruption 12. The counter-pressure detector 20a can display a counter-pressure exerted on the stationary goods 4 immediately beneath the interruption 12 when the drive means 14a is driven contrary to the direction of fall 10. The counter-pressure can compress and thus damage the goods 4. Stationary means that the goods 4 remain directly at the interruption 12 and do not simply just pass this. The counter-pressure is countered when further driving of the drive means 14a is stopped as soon as goods 4 are stationary at the counter-pressure detector 20a. The layer formation detector 20b is designed to detect a height of the formed layers in the immediate vicinity of the interruption 12. The layer formation detector 20b indicates on its arranged height whether layer stacks of goods 4 have already formed parallel to the lower sliding surface 8a. As layer stacks preferably form beneath the interruption 12 and the height of the layer stacks formed on the lower sliding surface 8a essentially reaches the height of the upper sliding surface 8b owing to their construction, positioning of the layer formation detector 20b in the immediate vicinity of the interruption 12 essentially at the height of the upper sliding surface 8b is expedient.

In order to enable a conventional and therefore problem-free implementable technical solution for the contact-free detection of goods 4, the at least one detector 20 used and/or the terminal detector 20c and/or the counter-pressure detector 20a and/or the layer formation detector 20b each comprises at least one light barrier.

To directly actuate the drive means 14a, the transport chute 2 also comprises a control device 22 by means of which the drive means 14a can be actuated. The control device 22 is connected to the detectors 20, 20a, 20b, 20c and the drive means 14a. Driving of the drive means 14a in or contrary to the direction of fall 10 or a standstill can take place according to different criteria. The criteria can, for example, comprise time, amount or weight of the goods 4 passing through the chute and/or a function of the detection of the presence or absence of the goods 4 at suitable points on the transport chute 2. The control device 22 is adapted to distinguish whether a goods item 4 is stationary on the detector 20 or is just passing this detector 20. As a result, actuation of the drive means 14a can take place depending on whether the goods 4 are actually stationary on the detector 20. Otherwise, the simple passing of the detected goods 4 would trigger actuation, resulting in the transportation of the goods 4 in what would actually be an undesirable direction of transport. To this end, the control device 22 comprises a logic module which is designed to display the stationary presence of the goods 4 and/or with which rules for the actuation of the drive means 14a can be read out.

Figure 2:
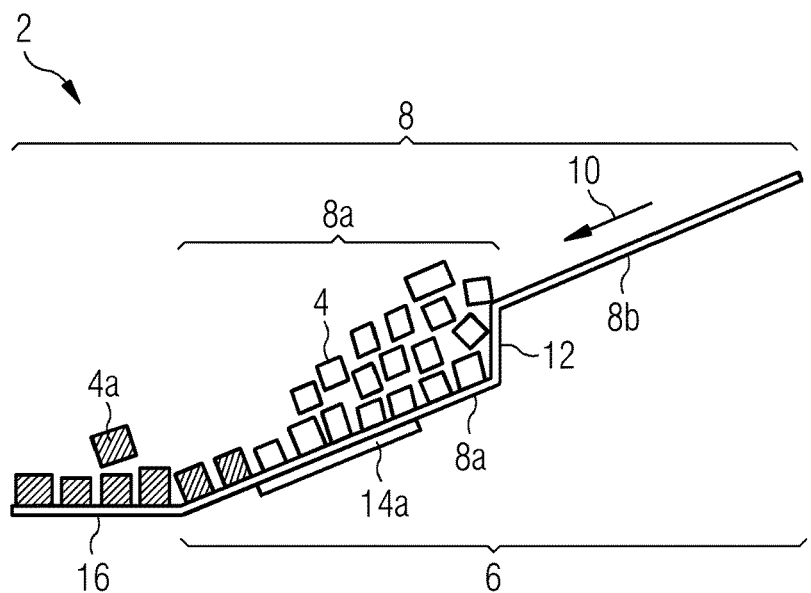
FIG. 2 The transport chute illustrated in FIG. 1 which was filled without actuation of a drive means contrary to the direction of fall.

FIG. 2 shows the transport chute 2 already illustrated in FIG. 1 which was filled without actuation of the drive means 14*a* contrary to the direction of fall 10. Such filling corresponds to the prior art. During filling the drive means 14*a* can stop and/or be operated in the direction of fall 10. Goods 4*a* in the vicinity of the chute terminal 16 and in the lower region of the lower sliding surface 8*a* form barely any layer stacks such that the entire available volume of the transport chute 2 in the vicinity of the chute terminal 16 and/or in the lower region of the lower sliding surface 8*a* cannot be used for storage. Goods 4 which are initially in the upper region of the lower sliding surface 8*a* conversely form several layer stacks parallel to the sliding surface 8 as the interruption 12 facilitates such a formation. Therefore, only the volume of the transport chute 2 available in the upper region of the lower sliding surface 8*a* is used advantageously for storage, wherein this also only occurs after the complete formation of the bottom layer over the entire sliding surface 8 beneath the interruption 12.

Figure 3:
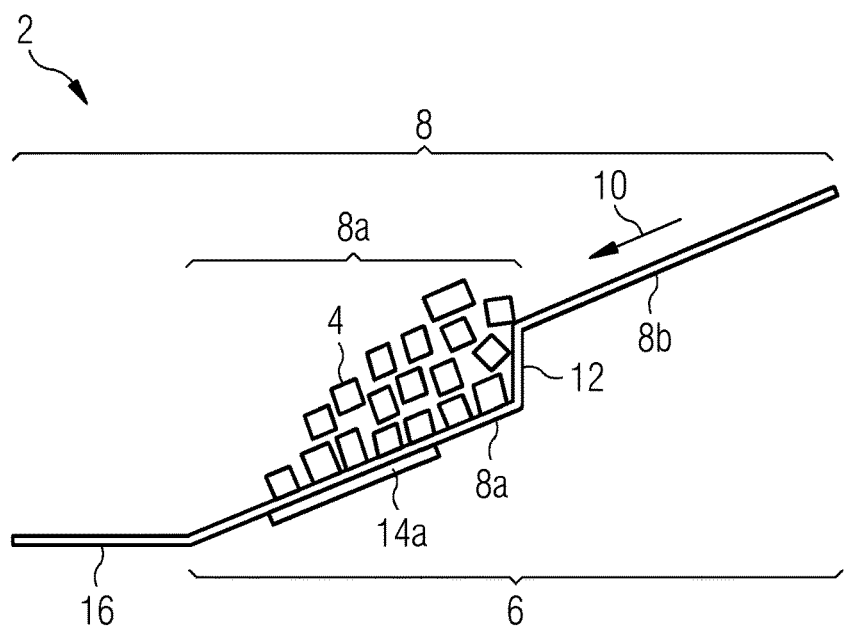
FIG. 3 A formation of layer stacks of goods on the transport chute illustrated in FIG. 1 which was filled with actuation of the drive means contrary to the direction of fall.

FIG. 3 shows a diagrammatic view of formed layer stacks of goods 4 on the transport chute 2 shown in FIG. 1 with actuation of the drive means 14*a* contrary to the direction of fall 10 during the filling of the transport chute 2. In order to advantageously fill the transport chute with the aid of a method for the storage and/or simplified discharge of goods 4, which can be disposed one above the other, on a transport chute 2 from the start, the initial method step is to let the goods 4 pass along the sliding surface 8 in the direction of fall 10. The next method step is to transport the goods 4 by means of the drive means 14*a* operated contrary to the direction of fall 10. As a result, the goods 4 passing the interruption 12 are initially transported not to the chute terminal 16, but to the interruption 12. The goods 4 thus already form a dense bottom layer in the upper region of the lower sliding surface 8*a* directly beneath the interruption 12 before this is formed over the entire sliding surface 8 beneath the interruption 12. Subsequently, this enables the overall advantageous filling of the transport chute. Furthermore, the driving of the drive means 14*a* contrary to the direction of fall 10 following the complete filling of the transport chute 2 reduces the dynamic pressure on the goods 4 in the chute terminal 16. This is useful for simplified discharge and reduces the likelihood of damage to the goods 4 in the chute terminal 16.

The formation of at least one further layer resting on the bottom layer in the upper region of the lower sliding surface 8*a* takes place by letting further goods 4 pass over the interruption 12 along the sliding surface 8 in the direction of fall 10. These goods 4 form further layers above the bottom layer in the upper region of the lower sliding surface 8*a*. As a result, the storage capacity of the transport chute 2 in the upper region of the lower sliding surface 8*a* is already increased before the complete formation of the bottom layer over the entire lower sliding surface 8*a*. The actuation of the drive means 14*a* contrary to the direction of fall 10 increases the counter-pressure in the direction of the interruption 12 acting on the goods 4 in the upper region of the lower sliding surface 8*a* in the vicinity of the interruption 12. In the upper region of the lower sliding surface 8*a*, filling with goods 4 approximately corresponds to the filling shown in FIG. 2 according to the prior art. For a transport chute 2 filled as in FIG. 2, the actuation of the drive means 14*a* contrary to the direction of fall 10 reduces the dynamic pressure acting on the goods 4*a* in the chute terminal 16.

Figure 4:
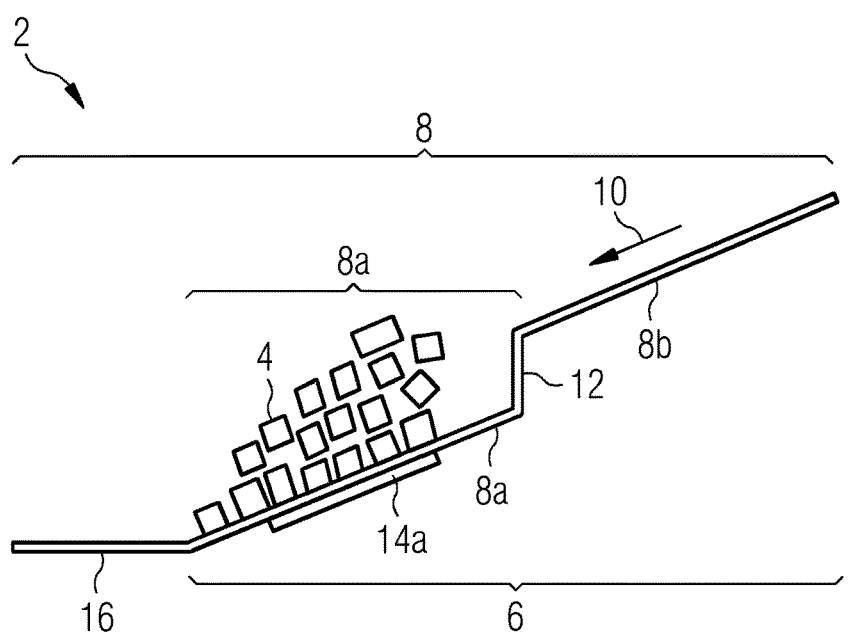
FIG. 4 The transport slide first filled as in FIG. 3 and then operated in the direction of fall from FIG. 1.

FIG. 4 shows the transport chute 2 of FIG. 1 which was first filled as shown in FIG. 3 and then operated in the direction of fall 10. Therefore, following the actuation of the drive means 14*a* contrary to the direction of fall 10, actuation of the drive means 14*a* in the direction of fall 10 takes place. The transport of goods 4 by means of the drive means 14*a* in the direction of fall 10 can take place by means of an active drive, but also passively by way of gravity feed, which may also include deceleration. Between the change which can take place following the embodiment shown in FIG. 3, the drive means 14*a* can stop. Hereby, several layers of goods 4 already formed parallel to the sliding surface 8 in the upper part of the lower sliding surface 8*a* are transported in their entirety in the direction of the chute terminal 16. Without removal, these layer stacks would hamper the passing of further goods 4 in the direction of the chute terminal 16 and thus hamper or render virtually impossible the advantageous filling of the transport chute 2 in the vicinity of the chute terminal 16 as the goods 4 above the bottom layer usually wedge disadvantageously with the bottom layer and each other. Individual goods 4 not resting directly on the sliding surface 8 cannot pass to the chute terminal 16 unhindered, but the layer stack can be reliably transported in its entirety with the aid of the drive means 14*a* in the direction of fall 10. This results in space beneath the interruption 12 for further filling. Further filling can, but need not, also take place during the actuation of the drive means 14*a* in the direction of fall 10 and thus simultaneously with the removal of the layer stacks.

Figure 5:
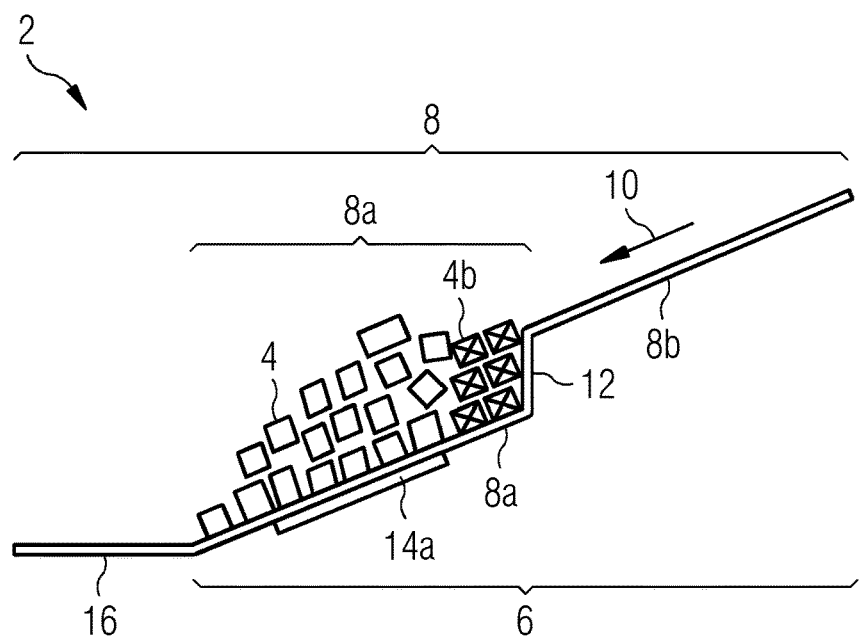
FIG. 5 The filled transport chute from FIG. 1 first shown as in FIGS. 3 and 4 after further filling.

FIG. 5 shows the transport chute 2 from FIG. 1 which was initially filled as shown in FIGS. 3 and 4 after further filling. The space beneath the interruption 12 shown in FIG. 4 was filled with further goods 4*b* which have passed the interruption 12 after and/or during the transportation of the layer stacks of goods 4 in the direction of fall 10. As filling takes place in the upper region of the lower sliding surface 8*a*, layer stacks which are tightly packed and thus advantageously taking advantage of the volume of the transport chute 2 can form there. During filling, the drive means 14*a* can stop and/or be actuated contrary to the direction of fall 10 and/or in the direction of fall 10. This method step and further details of a preferred embodiment of the method for the filling of the transport chute 2 are described in more detail in the dependent and independent claims.

Figure 6:
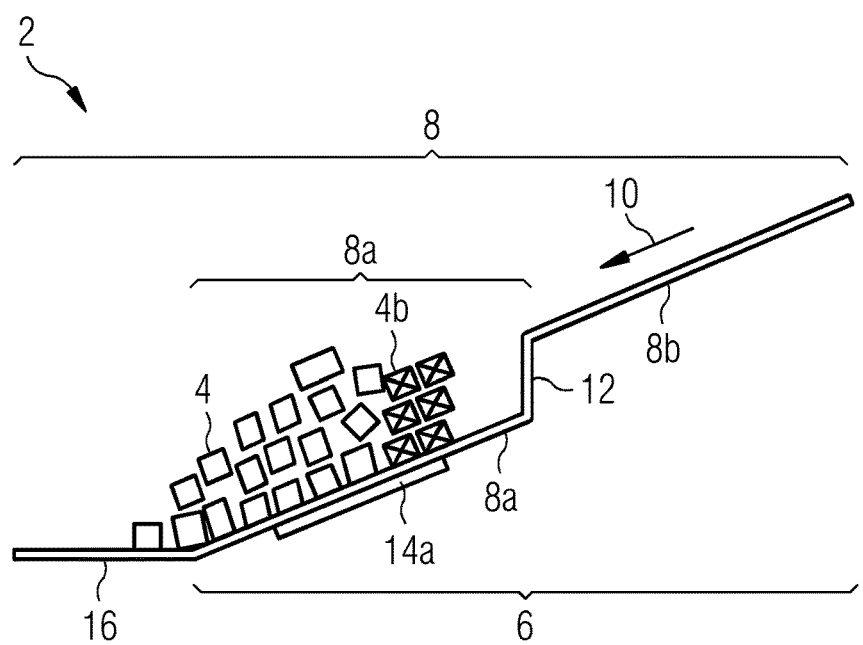
FIG. 6 The transport chute filled as in FIG. 5 from FIG. 1, wherein the drive means was operated in the direction of fall following the situation illustrated in FIG. 5.

FIG. 6 shows the transport chute 2 from FIG. 1 filled as in FIG. 5, wherein the drive means 14*a* was operated in the direction of fall 10 following the situation shown in FIG. 5. Analogous to the embodiment shown with the aid of FIG. 4, space is hereby produced in the upper region of the lower sliding surface 8*a* for further filling as the layer stacks of goods 4 and 4*b* were transported in the direction of the chute terminal 16 in their entirety. Further filling can likewise take place analogously to that with the aid of the preferred embodiments of the method illustrated by FIGS. 3, 4 and 5 described in more detail in the independent and dependent claims. The comparison of FIG. 5 and FIG. 6 respectively with FIG. 2 also shows a more advantageous filling of the transport chute 2 in the lower region of the lower sliding surface 8*a*. By means of further filling of the transport chute 2 using the method described in the dependent and independent claims, an equally advantageous filling of the transport chute 2 also takes place in the chute terminal 16 and/or in the lower region of the lower sliding surface 8*a* as this is only possible in the upper region of the lower sliding surface 8*a* according to the prior art. This filling thus increases the storage capacity of the transport chute 2 overall, without increasing its space requirement.

In order, for example, to enable the iterative performance of the method for storage and/or simplified discharge of goods 4, which can be disposed one above the other, on a transport chute 2 with a long sliding surface 8, after the actuation of the drive means 14*a* in the direction of fall 10, the drive means 14a can again be driven contrary to the direction of fall 10. However, the renewed driving of the drive means 14a contrary to the direction of fall only leads to the better filling of the transport chute 2 before the complete formation of the bottom layer beneath the interruption 12, otherwise it only increases the counter-pressure on the goods 4 immediately beneath the interruption 12. The bottom layer can be formed, for example, with the aid of the aforementioned terminal detector 20c.

In order to prevent excessive counter-pressure being directly exerted on the goods 4 immediately beneath the interruption 12 as a result of driving the drive means 14a contrary to the direction of fall 10, the drive means 14a is driven contrary to the direction of fall 10 until the goods 4 are stationary immediately beneath the interruption 12 on the lower sliding surface 8a. Stationary here means that the goods 4 do not move further in the direction of fall 10 but remain in their current position when actuation of the drive means 14a is unchanged. This could detect a detector 20 installed at this point such as, for example, the counter-pressure detector 20a.

In order to ensure that the goods 4 are only removed from the interruption 12 in the direction of fall 10 after the upper region of the lower sliding surface 8a was advantageously filled with layer stacks of goods 4 to take advantage of the volume, the drive means 14a is only driven in the direction of fall 10 again if two or more layers have formed directly at the interruption 12 in the upper region of the lower sliding surface 8a. Whether layer stacks have formed can be detected by a detector 20 installed at this point such as, for example, the layer formation detector 20b.

In order that no additional dynamic pressure is exerted on the goods 4 in the chute terminal 16 by the drive means 14a, the drive means 14a is only driven in the direction of fall 10 as long as there are no goods 4 stationary in the chute terminal 16. Stationary here means that the goods 4 remain in their current position in the chute terminal 16, in other words, they are not unloaded or transported into a region further up on the sliding surface 8 by driving the drive means 14a contrary to the direction of fall 10. It should be noted that a general prohibition on driving the drive means 14a in the direction of fall 10 when there are goods 4 present in the chute terminal 16 is only expedient if it is ensured that goods 4 cannot pass the drive means 14a until the bottom layer has been fully formed. However, this should be ensured for filling according to the aforementioned method. For when driving the drive means 14a contrary to the direction of fall 10 at the start of the method, the presence of goods 4 in the chute terminal 16 is synonymous with the complete formation of the bottom layer, at least if the drive means 14a extends over the entire width of the lower sliding surface 8a and thus detects all passing goods 4 for transport.

The drive means 14a is actuated as a function of the detection of the presence or absence of goods 4 at appropriate points on the transport chute 2. In the process, the presence or absence of goods 4 is detected in the chute terminal 16 and/or immediately beneath the interruption 12 on the lower sliding surface 8a and/or in the immediate vicinity of the interruption 12 essentially at the height of the upper sliding surface 8b. Detection at these points on the transport chute 2 provides information about their filling status. The filling status can be used to actuate the drive means 14a. Detection can take place with the aid of the at least one detector 20 comprising the terminal detector 20c and/or the counter-pressure detector 20a and/or the layer formation detector 20b.

In order not to additionally increase and/or to actively reduce the dynamic pressure on the goods 4 in the chute terminal 16, the presence of goods 4 in the chute terminal 16 does not permit actuation of the drive means 14a in the direction of fall 10 and/or produces actuation of the drive means 14a contrary to the direction of fall 10. In order for a bottom layer of goods 4 to be able to form tightly packed in the upper region of the lower sliding surface 8a, before it is completely formed over the entire lower sliding surface 8a, an absence of goods 4 immediately beneath the interruption 12 on the lower sliding surface 8a produces actuation of the drive means 14a contrary to the direction of fall 10. As long as there are no goods 4 stationary at the interruption 12, this actuation of the drive means 14a contrary to the direction of fall 10 cannot in principle lead to an undesirable increase in counter-pressure. The simultaneous presence of goods 4 immediately beneath the interruption 12 on the lower sliding surface 8a and in the immediate vicinity of the interruption 12 essentially at the height of the upper sliding surface 8b indicates that layer stacks have formed immediately beneath the interruption 12 and produces actuation of the drive means 14a in the direction of fall 10 which can be followed by a standstill and by the actuation of the drive means 14a contrary to the direction of fall 10. This enables the filling of the lower region of the transport chute 2 which is just as advantageous as the filling which has taken place in the upper region of the lower sliding surface 8a. Through the actuation of the drive means 14a in the direction of fall 10, the layer stacks are transported away from the interruption 12 in the direction of fall 10. A standstill of the drive means 14a does not additionally increase the dynamic pressure on the goods 4 in the chute terminal 16. A renewed actuation of the drive means 14a contrary to the direction of fall 10 after actuation in the direction of fall 10 on the one hand enables the active reduction of the dynamic pressure on the goods in the chute terminal 16 and, on the other hand, the iterative performance of the method for storage and/or simplified discharge of goods 4, which can be disposed one above the other, on a transport chute 2.

To enable the automatic performance of the method, the drive means 14a is automatically actuated. Automatic actuation also comprises the determination of the drive direction as well as a standstill according to criteria other than the presence or absence of goods 4 at appropriate points on the transport chute 2. This comprises actuation according to time and/or as a function of the amount and/or the weight of the goods which have passed through the transport chute 2 overall.

LIST OF REFERENCE CHARACTERS

2 Transport chute
4 Goods
4a Goods in the chute terminal 16 and in the lower region of the lower sliding surface 8a for filling according to the prior art
4b Goods which have passed the interruption 12 after and/or during transportation of the goods 4 in the direction of fall 10
6 Slide section
8 Sliding surface
8a Lower sliding surface
8b Upper sliding surface
10 Direction of fall
12 Interruption
14a Drive means 16 Chute terminal
18 Sorter
20 Detector
20a Counter-pressure detector
20b Layer formation detector
20c Terminal detector
22 Control device

The invention claimed is:

1. A transport chute suitable for use as a storage facility for goods which can be disposed one above another, the transport chute comprising:
   a slide section having an inclined sliding surface with a direction of fall along said inclined sliding surface, said inclined slide section being interrupted by at least one interruption such that said inclined sliding surface is divided into at least one upper sliding surface and one lower sliding surface, said interruption configured to facilitate a formation of at least two layers, disposed one above the other, of the goods beneath said interruption;
   at least said lower sliding surface having at least one drivable and controllable driver for transporting the goods contrary to the direction of fall on which the goods of a bottom layer can rest at least partially for their transportation; and
   said at least one upper sliding surface and said lower sliding surface both having a direction of inclination coinciding with the direction of fall.

2. The transport chute according to claim 1, further comprising a chute terminal disposed beneath said slide section at which the goods can be removed.

3. The transport chute according to claim 1, further comprising at least one detector for contact-free detection of the goods on the transport chute.

4. The transport chute according to claim 3, further comprising a control device by which said driver can be actuated.

5. The transport chute according to claim 4, wherein said control device is adapted to distinguish whether a goods item is stationary on said detector or just passes said detector.

6. The transport chute according to claim 3, wherein said at least one detector is selected from the group consisting of:
   a terminal detector configured to detect the goods in said chute terminal;
   a counter-pressure detector for detecting the goods resting on said lower sliding surface immediately beneath said interruption; and
   a layer formation detector for detecting a height of the layers formed in an immediate vicinity of said interruption.

7. The transport chute according to claim 6, wherein at least one of said terminal detector, said counter-pressure detector or said layer formation detector has at least one light barrier.

8. The transport chute according to claim 3, wherein said at least one detector includes:
   a terminal detector configured to detect the goods in said chute terminal;
   a counter-pressure detector for detecting the goods resting on said lower sliding surface immediately beneath said interruption; and
   a layer formation detector for detecting a height of the layers formed in an immediate vicinity of said interruption.

9. The transport chute according to claim 1, wherein said driver has at least one of a roller conveyor or a conveyor belt.

10. The transport chute according to claim 1, wherein said interruption is a step.

11. A method for storing and/or a simplified discharging of goods, which can be disposed one above another, on a transport chute, the transport chute having a slide section with an inclined sliding surface, with a direction of fall along the inclined sliding surface, and a chute terminal beneath the slide section, the inclined slide section being interrupted by at least one interruption such that the sliding surface is divided into at least one upper sliding surface and one lower sliding surface, at least the lower sliding surface having at least one drivable and controllable driver contrary to the direction of fall on which the goods of a bottom layer can rest at least partially, which comprises the following method steps of:
   letting the goods pass along the inclined sliding surface in the direction of fall;
   transporting the goods by the driver contrary to the direction of fall; and
   driving the driver contrary to the direction of fall until the goods are stationary immediately beneath the interruption on the lower sliding surface and a renewed driving of the driver in the direction of fall only takes place if at least layers have formed directly on the interruption in the upper region of the lower sliding surface.

12. The method according to claim 11, which further comprises forming at least one further layer resting on the bottom layer in an upper region of the lower sliding surface by allowing further goods to pass over the interruption along the inclined sliding surface in the direction of fall.

13. The method according to claim 11, wherein following actuation of the driver contrary to the direction of fall by actuation of the driver in the direction of fall, the driver can stop between a change, several layers of goods formed parallel to the inclined sliding surface in the upper part of the lower sliding surface are already transported in the direction of the chute terminal overall.

14. The method according to claim 13, wherein after the actuation of the driver in the direction of fall, the driver is again driven contrary to the direction of fall.

15. The method according to claim 11, which further comprises driving of the driver in the direction of fall only takes place as long as none of the goods are stationary in the chute terminal.

16. The method according to claim 11, which further comprises:
   depending on a detection of a presence or absence of the goods at appropriate points on the transport chute, the driver is actuated; and
   detecting the presence or the absence of the goods in the chute terminal and/or immediately beneath the interruption on the lower sliding surface and/or in the immediate vicinity of the interruption at a height of the upper sliding surface.

17. The method according to claim 11, wherein at least one of the following occur:
   a presence of the goods in the chute terminal does not permit the actuation of the driver in the direction of fall and/or produce an actuation of the driver contrary to the direction of fall;
   an absence of the goods immediately beneath the interruption on the lower sliding surface produces an actuation of the driver contrary to the direction of fall; and a simultaneous presence of the goods immediately beneath the interruption on the lower sliding surface and in an immediate vicinity of the interruption results in an actuation of the driver in the direction of fall at a height of the upper sliding surface, which can be followed by a standstill and by the actuation of the driver contrary to the direction of fall.

18. The method according to claim 11, wherein the driver is automatically actuated.

19. A method for storing and/or a simplified discharging of goods, which can be disposed one above another, on a transport chute, the transport chute having a slide section with an inclined sliding surface, with a direction of fall along the inclined sliding surface, and a chute terminal beneath the slide section, the inclined slide section being interrupted by at least one interruption such that the sliding surface is divided into at least one upper sliding surface and one lower sliding surface, at least the lower sliding surface having at least one drivable and controllable driver contrary to the direction of fall on which the goods of a bottom layer can rest at least partially, which comprises the following method steps of:

letting the goods pass along the inclined sliding surface in the direction of fall; and transporting the goods by the driver contrary to the direction of fall.

* * * * *